April 2, 1940.   C. T. PATTERSON   2,195,658
EGG CANDLER
Filed Sept. 21, 1938
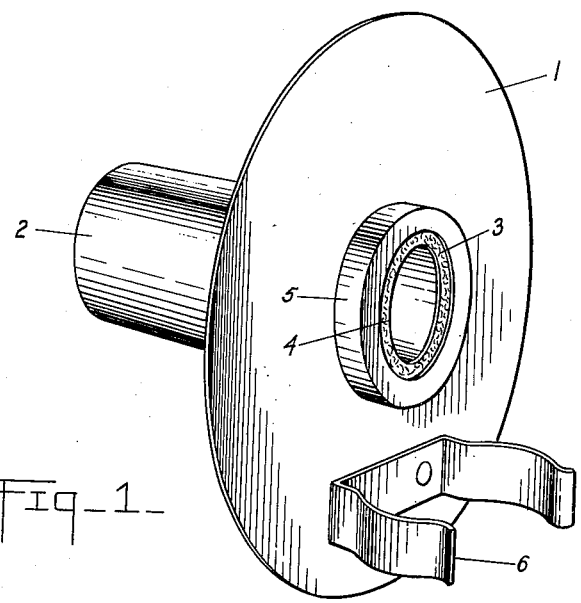
Fig-1-
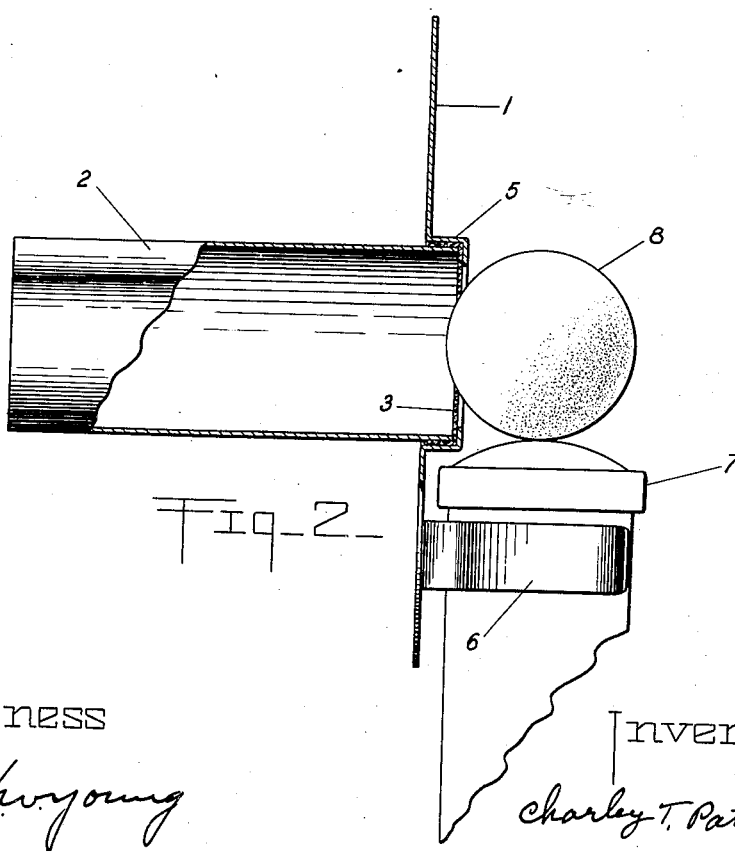
Fig-2-
Witness
H. W. Young
Inventor
Charley T. Patterson Patented Apr. 2, 1940

2,195,658

UNITED STATES PATENT OFFICE 2,195,658

EGG CANDLER

Charley T. Patterson, Springfield, Mo.

Application September 21, 1938, Serial No. 231,039

3 Claims. (Cl. 88—14.4)

My invention relates to an egg candling device and particularly to a device for use in home kitchens, restaurants, etc.

Prior art provides no simple, easily handled candler for homes, restaurants, hotels and the like. On the contrary, prior endeavors were concerned chiefly with machines for produce houses or other establishments where large numbers of eggs are inspected in the processes of commerce. Such devices require the observer or user to occupy a darkened room while a light is provided in another chamber, the egg being handled and viewed in the darkened room by the aid of a lighted aperture in the intervening wall. Such procedure obviously is not practicable in the case of the home or restaurant and has the further objectionable feature of directing the light rays directly toward the eyes of the observer, necessitating mechanism for throwing off the light when an egg is not covering the lighted aperture in order to prevent undue eyestrain. The fact that the operator is required to handle the eggs in a darkened room is of course a serious objection within itself.

One of my objects is to provide a handy, portable device for candling eggs which may be quickly and easily used and which will be inexpensive.

A further object is to provide a device which may be used in daylight or in a lighted room, or which, if desired may be used in a darkened room.

Another object is to provide a means for lighting the egg whereby a relatively large area of the egg receives the direct rays of the light source.

An additional object is to provide a means whereby the light rays which illuminate the egg are not directed toward the aperture through which the egg is viewed, thereby preventing the user from looking directly toward the light source when the aperture is not covered by an egg.

Another object is to provide a device which may be used in connection with an ordinary flash-light or with which sunlight may be employed as a light source.

Other objects and advantages will be presented in the following specification in connection with the accompanying drawing in which:

Fig. 1 is a perspective view of my device.

Fig. 2 is a side elevation, partly in section showing its association with a flash-light and an egg.

In these figures, 1 represents a shield member to which is attached the tube 2. 3 is a sheet of flexible material such as cloth, leather or rubber having a central opening 4. The edge of the sheet 3 is secured between the tube 2 and the flange 5 of the shield member 1. A spring member 6 is secured to the shield by riveting or the like. This spring member is designed to grip an ordinary flash-light 7 (Fig. 2) over which and against the opening 4 an egg 8 (Fig. 2) may be held.

It will be observed that with my device the light from the flash-light is utilized to light the egg by transmitting light throughout the entire egg while the condition of the egg is observed through the tube 2 and the opening 4, the tube providing a darkened enclosure and excluding light from the sides while the shield 1 provides a baffle for excluding light directly surrounding the tube which would otherwise render the device ineffective.

It will be observed that by presenting the light rays to the egg in the manner provided in my device the eyes of the observer are not subjected to intense light rays when an egg is not covering the aperture.

It will be further observed that while the eggs may be handled in daylight or a lighted room my device provides a darkened chamber through which the egg is observed thereby producing the contrasting effect desired without subjecting the user to the inconveniences of a dark room.

It will be noted that a greater area of the egg may be lighted by my means than by a device which presents the light to the egg through an opening against which the egg is held.

The present device may also be used in connection with sunlight instead of a flash-light by allowing the sun's rays to shine on the egg while holding the viewing end of the device in the shadow.

I have provided an inexpensive, light weight, handy means whereby the household or restaurant cook may easily candle eggs before breaking, thereby obviating offensive odors, as well as dispensing with the usual procedure of breaking each egg in a testing dish prior to use in cooking and in addition enabling the user to return "bad" eggs to the market unbroken for refund.

I claim:

1. An egg candling device comprising a tubular chamber having one open end and having at the opposite end a transversely disposed diaphragm, said diaphragm having a circular opening centrally thereof, said diaphragm immediately surrounding the circular opening being flexible, the outer face of said flexible portion forming an egg contacting ring, an annular shield member carried by said chamber and positioned adjacent said diaphragm, said shield extending radially from said chamber, and a resilient clamping means disposed on the outer face of said shield, said clamping means being adapted to detachably secure a flashlight to said shield with the axis of the flashlight substantially at right angles to the axis of the chamber and intersecting said axis outwardly of said chamber and in front of said opening.

2. An egg candler comprising a longitudinal chamber having opaque side walls and having one open end, said chamber having at the opposite end a transverse, centrally apertured wall, said transverse wall adjacent the central opening being resilient, whereby the outer face thereof forms a resilient egg contacting ring, a shield member carried by said chamber, said shield being positioned adjacent said wall and extending radially from said chamber, and a resilient clamp mounted on the shield member, said clamp being adapted to detachably secure a flashlight to said shield with the axis of the flashlight substantially at right angles to the axis of the chamber and intersecting said axis outwardly of said chamber and in front of said opening.

3. An egg candler comprising a tubular chamber having one open end and having at the opposite end a transversely disposed diaphragm, said diaphragm having a circular opening centrally thereof, said diaphragm adjacent the central opening being flexible whereby the outer face thereof forms a resilient egg contacting ring, a shield carried by said chamber, said shield extending radially from said chamber, and means for securing a flashlight to said candler with the axis of the flashlight substantially at right angles to the axis of the chamber and intersecting said axis outwardly of said chamber and in front of said opening.

CHARLEY T. PATTERSON.